United States Patent [19]
Jan

[11] Patent Number: 5,643,609
[45] Date of Patent: Jul. 1, 1997

[54] WINDSHIELD REPAIR DEVICE

[76] Inventor: Yih-Jang Jan, 2F, No. 41-1, Jong-Huah Rd., Shin-Juang City, Taipei Hsien, Taiwan

[21] Appl. No.: 518,002

[22] Filed: Aug. 22, 1995

[51] Int. Cl.$^6$ ................................................. B32B 35/00
[52] U.S. Cl. .................. 425/12; 156/94; 264/36; 425/13
[58] Field of Search .................. 425/11, 12, 13; 156/94; 264/36

[56] References Cited

U.S. PATENT DOCUMENTS

| | | | |
|---|---|---|---|
| 3,993,520 | 11/1976 | Werner | 425/13 |
| 4,775,305 | 10/1988 | Alexander | 425/13 |
| 4,826,413 | 5/1989 | Matles | 425/12 |
| 5,116,441 | 5/1992 | Campfield | 425/12 |
| 5,122,042 | 6/1992 | Einiger | 425/12 |
| 5,234,325 | 8/1993 | Hill | 425/12 |
| 5,407,338 | 4/1995 | Callahan | 425/12 |

*Primary Examiner*—Daniel Stemmer
*Attorney, Agent, or Firm*—Pro-Techtor International

[57] ABSTRACT

A windshield repair device including a base, several sucking disks connected with the base by several connecting rods, a pressurizing tank, a rotary bar and a plug block. The base is formed with a central axial thread hole and the pressurizing tank has a thread rod at one end for screwing into the thread hole of the base. The pressurizing tank further has an inner thread at a central section for engaging with an outer thread of the rotary bar. The plug block is plugged into a central hole of a bottom end of the pressurizing tank. When a repair liquid is filled into the pressurizing tank, the rotary bar is twisted downward in the pressurizing tank and a bottom end of the rotary bar is extended into a central hole of the plug block to compress the air therein, whereby the pressure of the air forces the repair liquid to evenly flow into every corners of the fissure.

1 Claim, 7 Drawing Sheets

WINDSHIELD REPAIR DEVICE

BACKGROUND OF THE INVENTION

The present invention relates to a windshield repair device, and more particularly to a windshield repair device which utilizes air pressure to evenly force the repair liquid into a fissure of the windshield so as to more firmly, durably and smoothly repair the windshield.

When the windshield of a car is collided by a small rock or other alien particles, a fissure is often produced on the windshield. If the windshield is not repaired in time, the fissure will further expand to make the windshield become cracky. According to the conventional windshield repair measure, a repair liquid is directly filled into the fissure to naturally flow along the fissure without being forced by any assistant air pressure. Therefore, the repair liquid often fails to flow into some tail ends of the fissure and thus the windshield can be hardly firmly and durably repaired. In addition, the repaired fissure often leaves an unsmooth surface on the windshield and results in a poor appearance.

Therefore, it is necessary to provide an improved windshield repair device which is able to more firmly, durably and smoothly repair the windshield.

SUMMARY OF THE INVENTION

It is therefore a primary object of the present invention to provide an improved windshield repair device which utilizes air pressure to evenly force the repair liquid into every corners of a fissure of the windshield so as to more firmly, durably and smoothly repair the windshield.

The present invention can be best understood through the following description and accompanying drawing, wherein:

DETAILED DESCRIPTION OF THE PREFERRED EMBODIMENT

Figure 1:
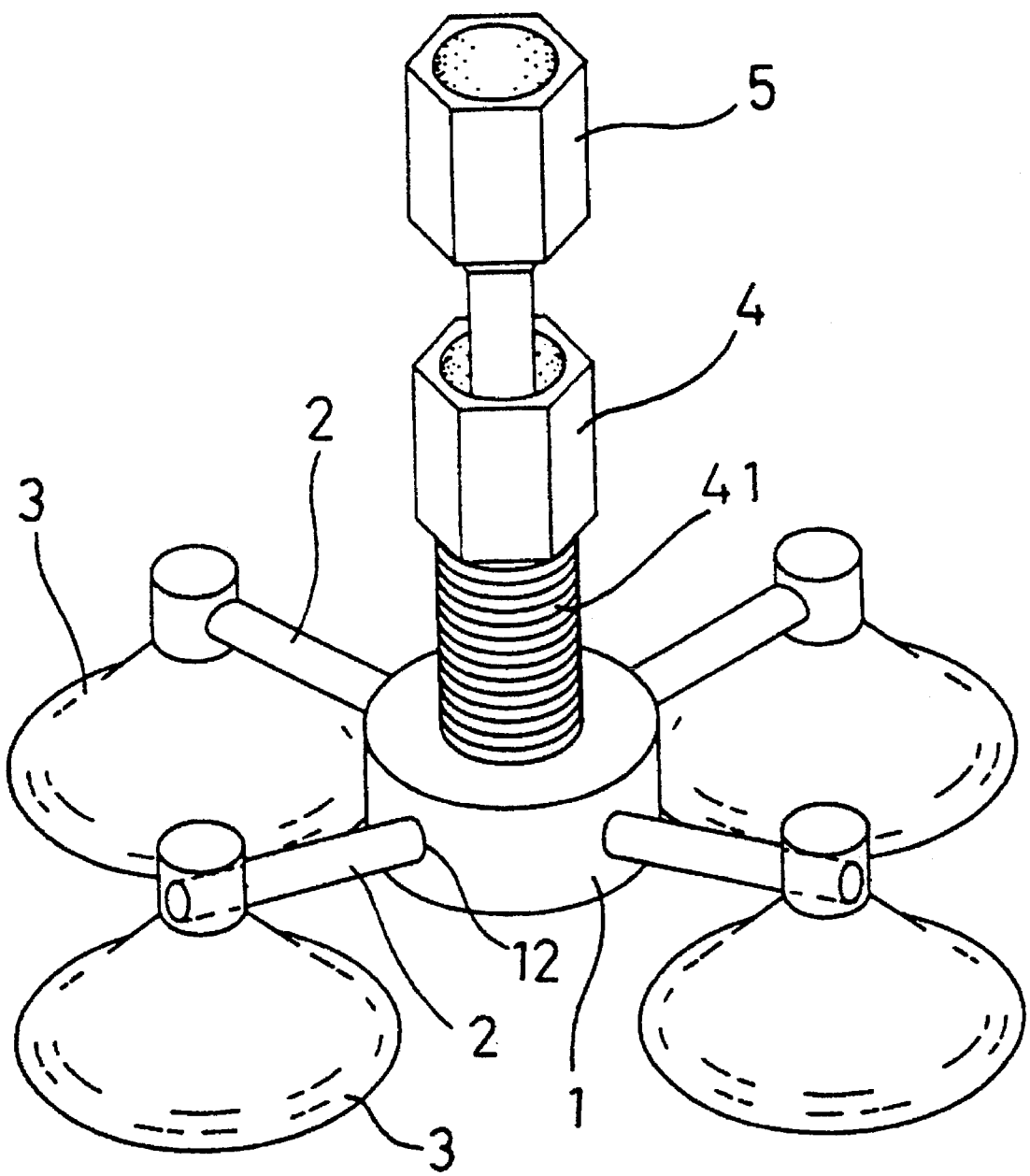
FIG. 1 is a perspective assembled view of the present invention.
Figure 2:
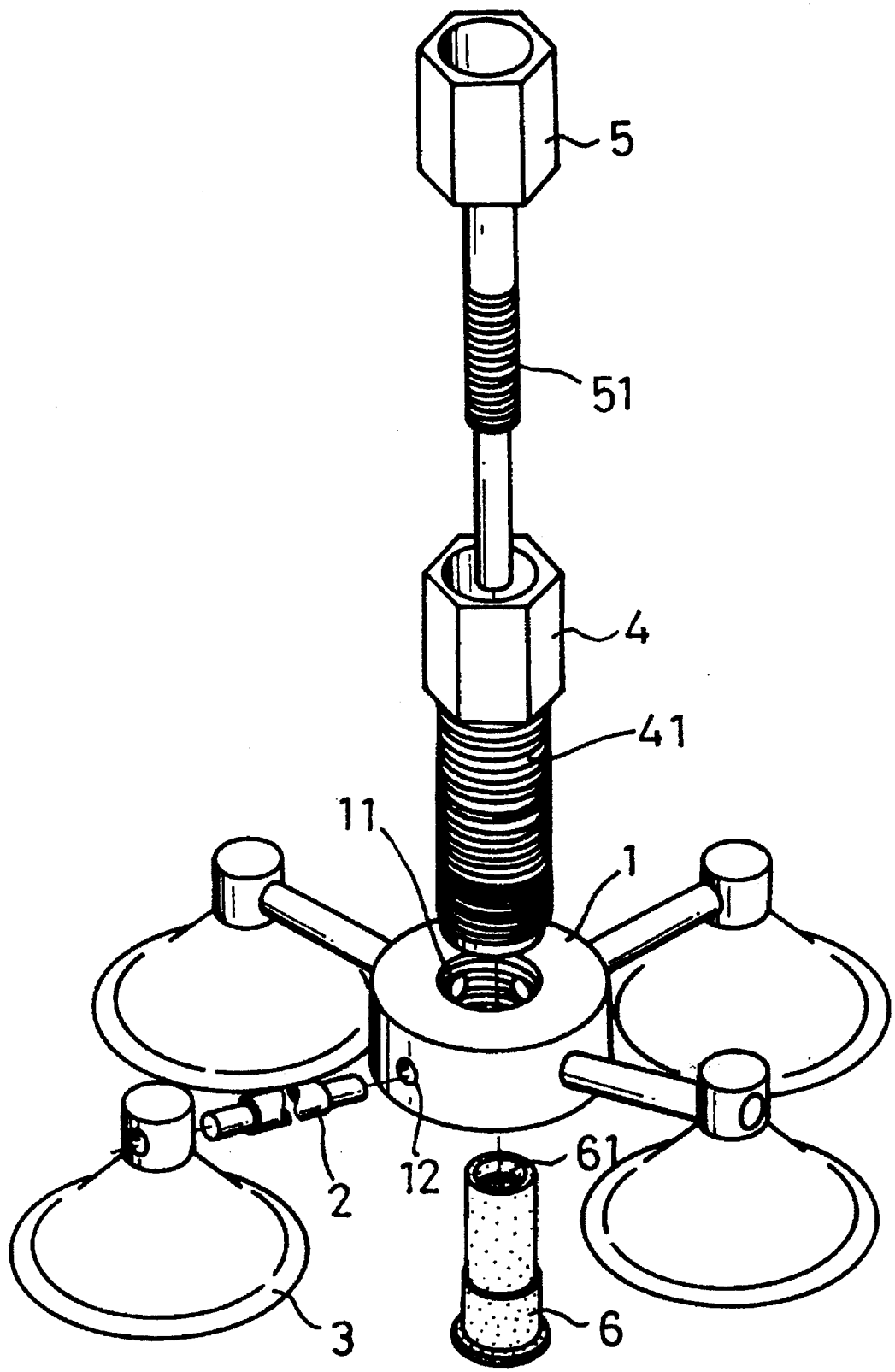
FIG. 2 is a perspective partially exploded view of the present invention.
Figure 3:
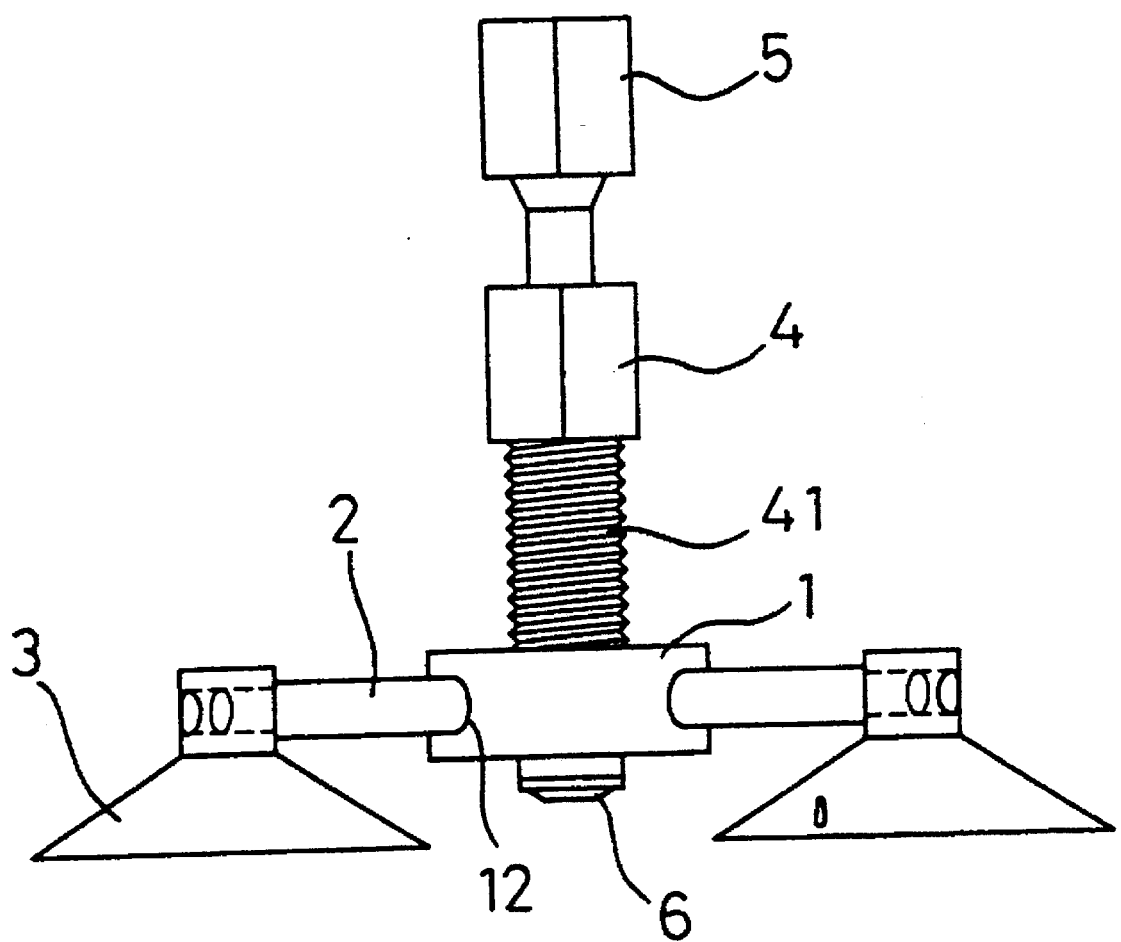
FIG. 3 is a side view of the present invention.
Figure 4:
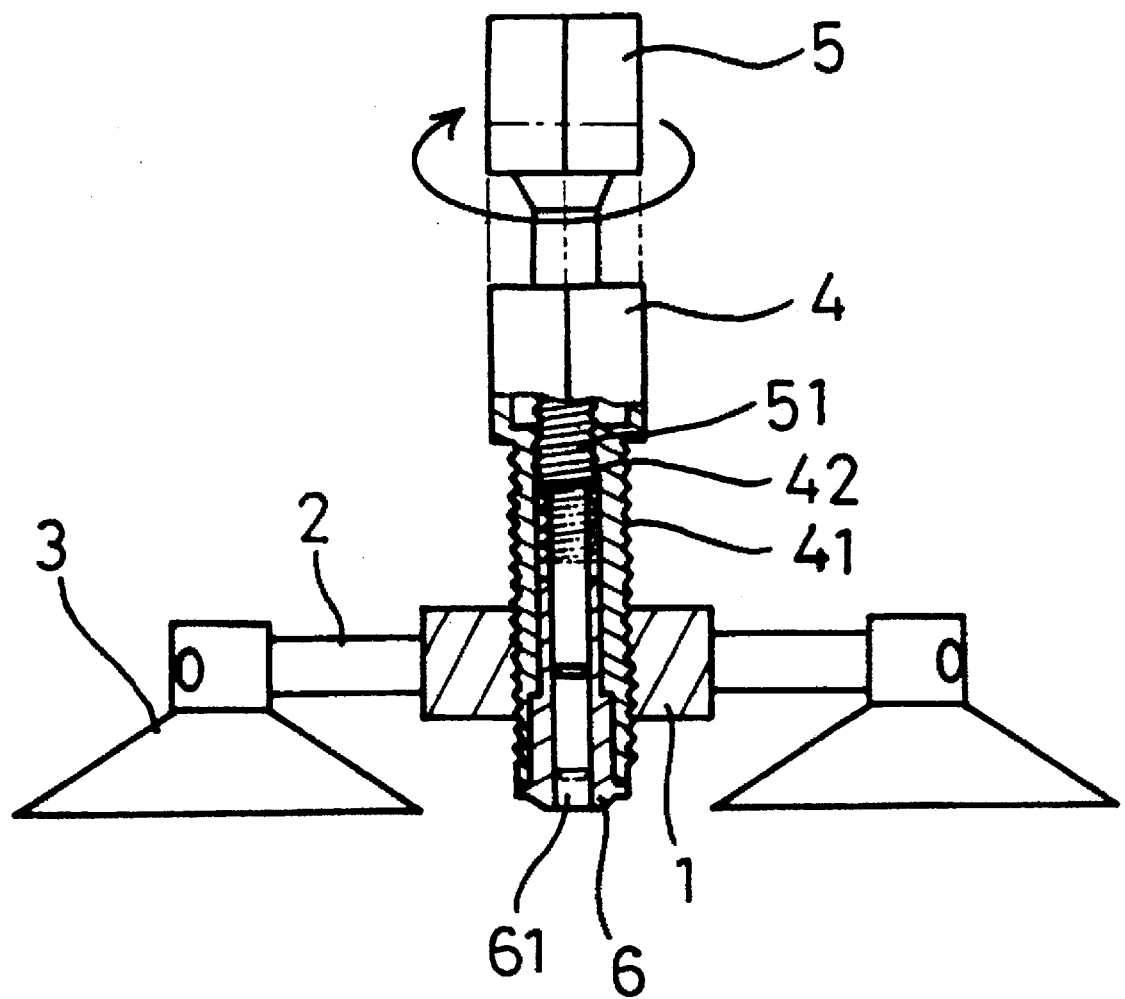
FIG. 4 is a side sectional view of the present invention.

Please refer to FIGS. 1 to 4. The present invention mainly includes a base 1, four connecting rods 2, four sucking disks 3, a pressurizing tank (repair material delivery element) 4, a rotary (pressurizing) bar 5 and a plug block (windshield contact member) 6. The base 1 is formed with a central axial thread hole 11 and several lateral radial pin holes 12. One end of each connecting rod 2 is inserted into a pin hole 12 and the other end of each connecting rod 2 is fixedly connected with one sucking disk 3.

The pressurizing tank 4 is hollow, having a thread rod 41 at one end for screwing into the thread hole 11 of the base 1. The pressurizing tank 4 further has an inner thread 42 at a central section and the rotary bar 5 has an outer thread 51 at a middle section for engaging with the inner thread 42 of the pressurizing tank 4. The plug block 6 is made of soft rubber material and plugged into a central hole of a bottom end of the pressurizing tank 4. When the rotary bar 5 is twisted downward in the pressurizing tank 4, a bottom end of the rotary bar 5 is extended into a central hole 61 of the plug block 6.

Figure 5:
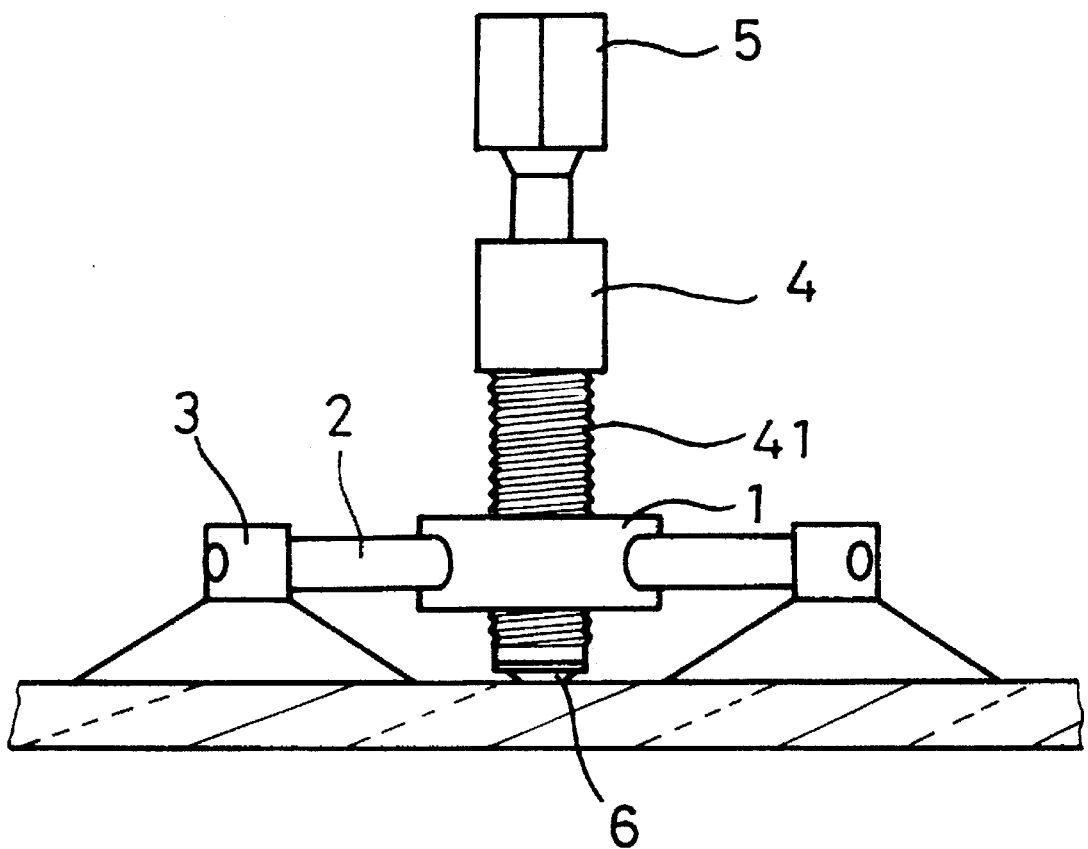
FIG. 5 is a side view showing the application of the present invention.

Please refer to FIG. 5. When the plug block 6 of the windshield repair device is aimed at a fissure of the windshield with the sucking disks 3 attached thereto, the pressurizing tank 4 is twisted downward to adjustably attach the plug block 6 to the windshield. Meanwhile, a repair liquid is filled into the pressurizing tank 4 to flow through the liquid exit of the plug block 6 into the fissure of the windshield. At this time, the repair liquid does not very evenly flow into every corners of the fissure yet. However, when the rotary bar 5 is twisted downward to extend into the central hole 61 of the plug block 6 and compress the air therein, the pressure of the air forces the repair liquid to evenly flow into every corners of the fissure. Therefore, the windshield with the repaired fissure will be very rigid and durable and the appearance of the repaired fissure will be smooth and tidy.

Figure 6:
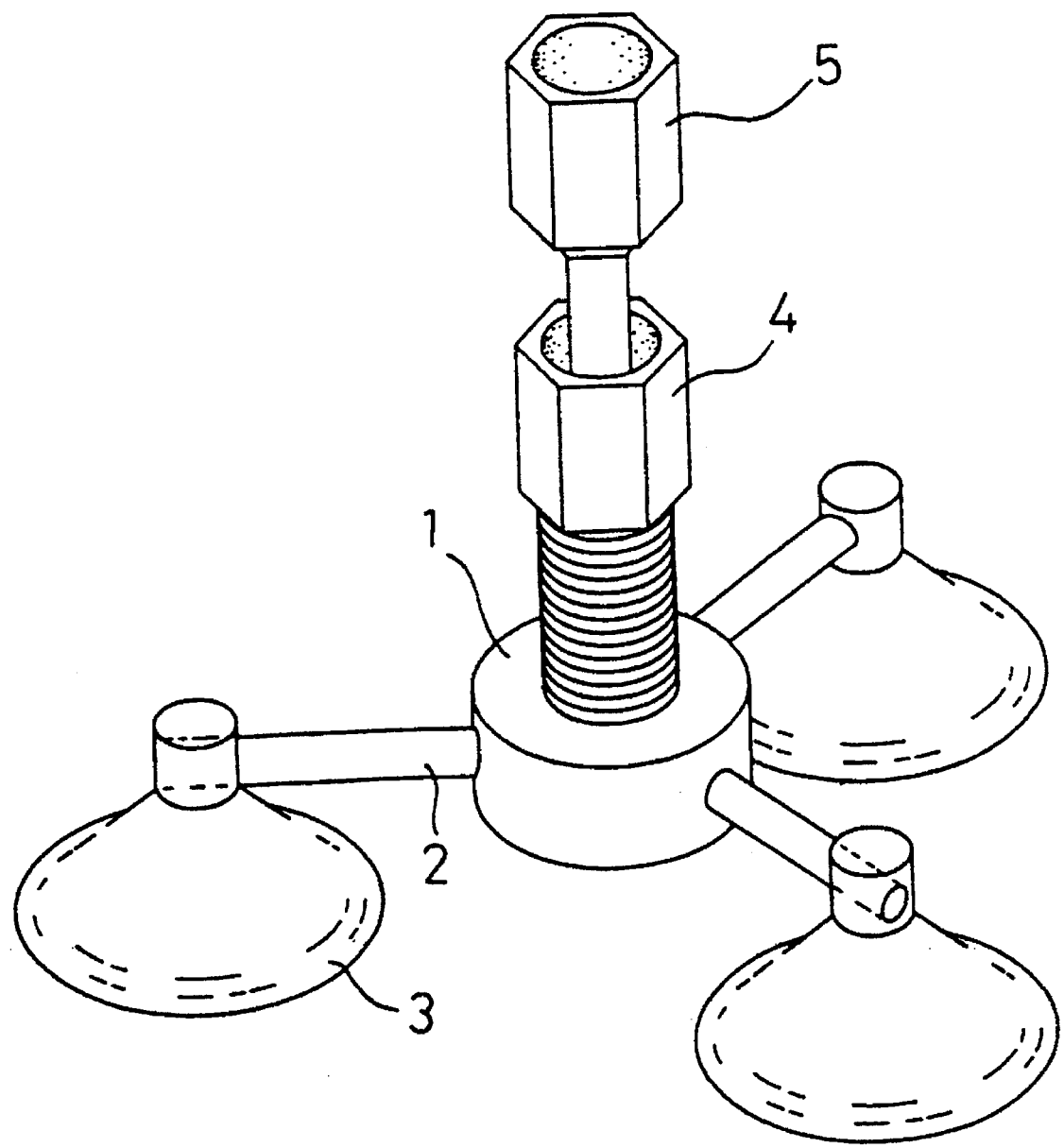
FIG. 6 shows another embodiment of the present invention.
Figure 7:
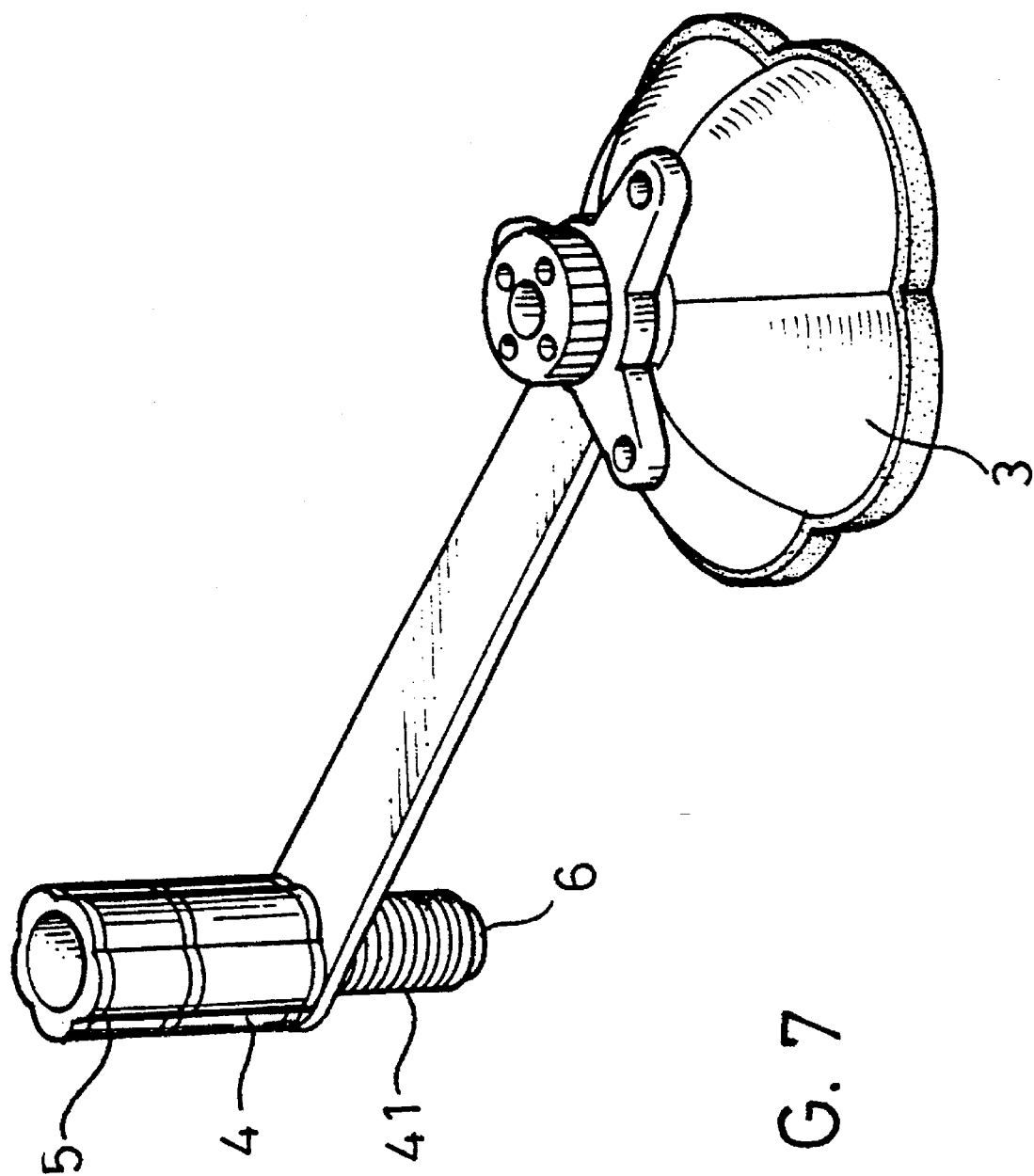
FIG. 7 shows still another embodiment of the present invention.

Please refer to FIGS. 6 and 7. The repair device of the present invention can alternatively have three sucking disks or a single sucking disk.

It is to be understood that the above description and drawings are only used for illustrating some embodiments of the present invention, not intended to limit the scope thereof. Any variation and derivation from the above description and drawings should be included in the scope of the present invention.

What is claimed is:

1. A windshield repair device comprising:

a base with a threaded central hole therein, four suction disks, means to fixedly connect said four suction disks to said base at ninety degree intervals, a repair material delivery element, a windshield contact member with a throughway therein, and a pressurizing bar; wherein said repair material delivery element includes a threaded portion at a lower end thereof that is received in said threaded central hole of said base, said repair material delivery element further includes a threaded interior cavity that mates with a threaded portion of said pressurizing bar, and said windshield contact member is received in a lower end of said interior cavity of said repair material delivery element; such that said device is securely mounted on a windshield by said suction disks, and said windshield contact member is brought into firm contact with a windshield by pressure from said repair material delivery element being threaded into said base, a repair material is inserted into said repair material delivery element and flows through said windshield contact member into a fissure in said windshield, and pressure is applied to said repair material by turning said pressurizing bar into said repair material delivery element so as to force said repair material into said fissure.

* * * * *